Aug. 12, 1969 I. L. KEITER ET AL 3,461,432

BI-DIRECTIONAL CODE CONVERTER

Filed Dec. 14, 1966 3 Sheets-Sheet 1

INVENTORS.
IRVIN L. KEITER
LEONARD H. SICHEL, JR.
EDGAR O. MORGENSON, JR.
CHARLES R. QUESTA

BY Thomas P. Murphy
ATTORNEY

BI-DIRECTIONAL CODE CONVERTER

Filed Dec. 14, 1966 3 Sheets-Sheet 2

INVENTORS.
IRVIN L. KEITER
LEONARD H. SICHEL, JR.
EDGAR O. MORGENSON, JR.
CHARLES R. QUESTA

BY Thomas P. Murphy
ATTORNEY

BI-DIRECTIONAL CODE CONVERTER

Filed Dec. 14, 1966 3 Sheets-Sheet 3

INVENTORS.
IRVIN L. KEITER
LEONARD H. SICHEL, JR.
EDGAR O. MORGENSON, JR.
CHARLES R. QUESTA
BY
Thomas P. Murphy
ATTORNEY

United States Patent Office 3,461,432

Patented Aug. 12, 1969

3,461,432

BI-DIRECTIONAL CODE CONVERTER

Irvin L. Keiter, Downingtown, Leonard H. Sichel, Jr., Bryn Mawr, and Edgar O. Morgenson, Jr., and Charles R. Questa, King of Prussia, Pa., assignors to Burroughs Corporation, Detroit, Mich., a corporation of Michigan Filed Dec. 14, 1966, Ser. No. 601,659

Int. Cl. G11b *13/00*

U.S. Cl. 340—172.5 6 Claims

ABSTRACT OF THE DISCLOSURE

The present disclosure deschribes a bi-directional code converter for converting data words to and from first and second codes comprising a memory matrix responsive to being addressed by a data word in a first or second code to provide as an output the data word in the second or first code, respectively. A memory address register receives the data words from either the central processor or subscriber unit and presents each data word as an address to the memory matrix. Control apparatus is provided which causes the converter to time share data words received from either the central processor or subscriber unit. The control apparatus also gives priority to data words from a selected direction when data words from both directions arrive simultaneously. The memory matrix utilizes ferrite cores prewired to cause the incoming data word to be the address which selects the conversion. The control apparatus then causes the data word to be delivered through appropriate gating to the subscriber unit or central processor in the proper code.

This invention relates to a code converter and more particularly, to a bi-directional code converter for interlinking a centrally located data processing system operating in one code with outlying subscriber communication systems utilizing other codes.

Present day data processing or computer technology has made feasible the concept of a centralized computer receiving input data from and providing data to remote and geographically dispersed substations. Thus, a real-time multiprocessor may simultaneously service a large number of remotely located subscribers. These subscribers may be the various outlying branches of a large corporation or they may be independent clients of a centrally located computer service. In any case, transmission of data between a remotely located subscribing substation and the central processor is attendant with many problems.

One of these problems is the incompatibility of the data word codes utilized by subscriber equipment and the data word code used within the central processor. In other words, the data transmitted from the outlying communication systems may be in a code foreign to that for which the central processor was designed to utilize.

Thus, in order to obtain communication between a central processor designed to operate on a single code and a subscriber unit which operates on a different code, it is necessary to provide interface equipment to convert incoming messages into the code of the central processor and to convert outgoing messages into the code used by the subscriber equipment.

Various prior art methods are employed for converting from one code to another to make the messages derived from an external system compatible in code to an internal message processor. One such method utilizes system programs wherein the system memory itself stores separate each character in the various codes which are to undergo conversion. The foreign coded character is used to address the system from which is read out the internal machine coded character.

Likewise, the internal coded character is used to address the system memory at another location from which is read out the foreign coded chartacter. Such a system requires separate memory address registers for incoming and outgoing coded characters and system memory space for each character of the code to be converted. Aside from requiring extra memory space, such a system utilizes valuable processing time.

Other code converting systems must employ separate logical hardware to decode the input character, address the memory and then regenerate or encode the output character.

The present invention contemplates a bi-directional code converter for converting data words to and from first and second codes. More specifically, the present invention comprises a wired core, diode memory matrix capable of being addressed by a data word in either of two codes. In being addressed by a data word in a first or second code, the matrix provides as an output the data word used in the second or first code, respectively. A single memory address register receives data words in either of the two codes and presents each received data word as a direct address to the diode memory matrix which responds to a data word in one code to provide the data word as an output in the other code.

The code converter of the present invention, which receives data words from a subscriber unit operating in one code and a central processor operating in the other code, is by appropriate control apparatus, caused to time-share the code converting circuitry. If a data word coming from a subscriber or from the central processor do not arrive at their respective input registers simultaneously, a priority control apparatus will inhibit one code conversion while enabling the other to proceed. The high priority conversion is completed in one microsecond and the low priority conversion is immediately initiated. If a conversion is in process and a data word arrives at the other input register, the operation in progress is completed as the high priority. The diode memory matrix, which comprises a ferrite core, is prewired to cause the incoming data word to be the address which selects the conversion and then delivers the data word through appropriate gating to the subscriber unit or the central processor in the required code.

The present invention employs a single wired core diode memory matrix for both input and output code conversions as well as only one set of input decoding gates in a time-sharing arrangement.

Therefore, it is an object of the present invention to provide a high speed, bi-directional code converter for use as an interface between a central processor and remote communication system each operating in different codes.

Another object of the present invention is to provide a bi-directional code converter where incoming or outgoing data words each share the same decoding apparatus and memory matrix during the conversion process.

A further object of the present invention is to provide a high speed code converter for converting one data code to another bi-directionally for use at a message switching center wherein each data word of the incoming and outgoing message is the address with which the appropriate code conversion is selected.

Other objects and many of the attendant advantages of the present invention will become more apparent with reading of the following description in conjunction with the accompanying drawings wherein.

Figure 1:
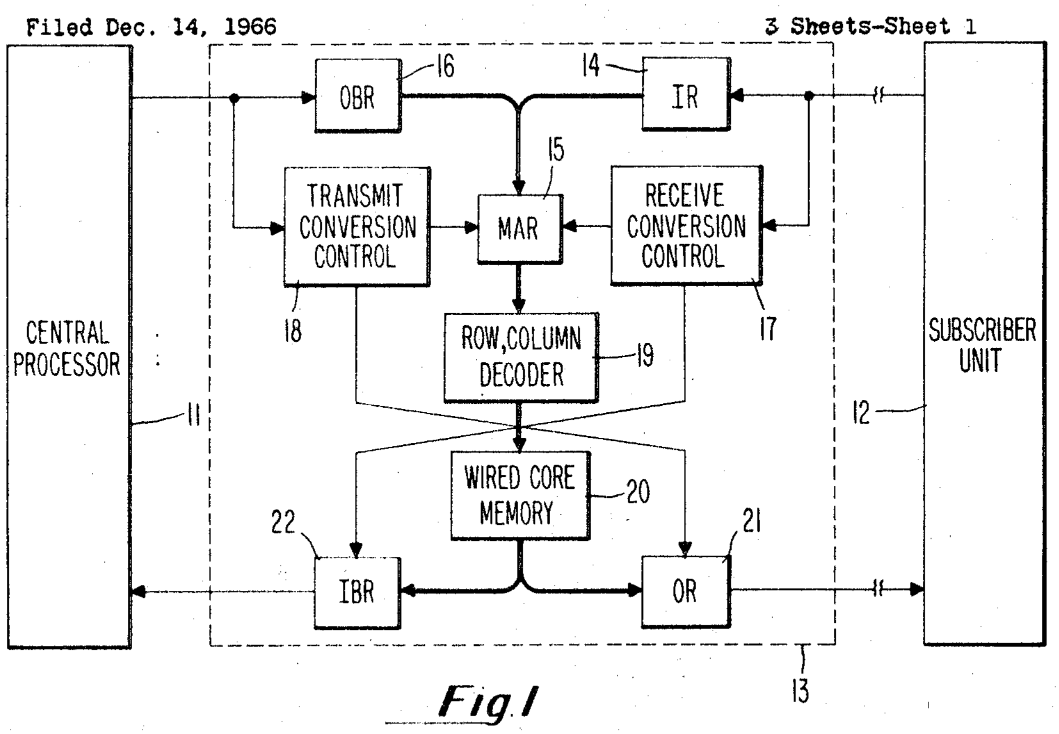
FIGURE 1 illustrates in block diagram form a preferred embodiment of the present invention.

Referring now more particularly to FIGURE 1, there is seen a code converting arrangement in which a central processor 11, which may be any conventional type of an electronic data processor, receives messages from one or more remote communications systems, such as subscriber unit 12. On receipt of the message the central processor 11 performs the requested processing of the message, creating new information which it transmits back to the subscriber unit 12. Since the central processor 11 operates in one code, the messages in another code from the subscriber 12 must be converted into the code of the central processor 11 before actual insertion therein. Likewise, the messages from the central processor 11 must be converted back into the code of the subscriber unit 12 before transmission thereto.

The code conversion of the messages from and to the subscriber unit 12 is accomplished by a code converter 13. The code converter 13 comprises an input register 14 connected to the subscriber unit 12 from which messages are received. Each message from the subscriber unit 12 is in the form of data words encoded in a particular code of "0's" and "1's", e.g., binary code. The input register 14 is a six-bit storage register of a conventional type which accepts data in serial form and provides it as an output in parallel form on six output terminals.

Similarly, an output buffer register 16 receives output data in serial from the central processor 11. The output buffer register 16 is similar to the input register 14. When a six bit word accumulates in the output buffer register 16, it appears as an output in parallel form on six output terminals.

The six output terminals from the input register 14 and the output buffer register 16, are connected to a memory address register 15 via appropriate control gating. The memory address register 15 is described in more detail hereinbelow, so that the present description of the overall combination may be presented in a continuous fashion.

The memory address register 15 is a six bit register used to store an input data word or an output data word before initiation of code conversion.

The outputs of the input register 14 and the output buffer register 16 are control gated into the memory address register 15. When it is sensed that a data word is present in one or the other of the registers 14 or 16, the code conversion cycle is initiated.

A receive conversion control 17 connected to the input of the input register 14 provides a code conversion initiation signal to the memory address register 15 each time the input register 14 has accumulated a complete data word. This initiation signal causes the data word in the input register 14 to be transferred into the memory address register 15 at which time the code conversion cycle is begun.

In a similar fashion, a transmit conversion control 18 connected to the input of the output buffer register 16 provides a code conversion initiation signal to the memory address register 15 each time the output buffer register 16 has a data word stored therein. This initiation signal from the transmit conversion control 18 causes the data word in the output buffer register to be transferred to the memory address register 15 at which time the code conversion cycle is begun.

The receive conversion control 17 and the transmit conversion control 18 are actually interrelated and will each be more fully described later in reference to FIGURE 3.

The memory address register 15 has six output terminals connected to a row, column decoder 19. If more than six bit words were being converted, the memory address register 15 would have more output terminals.

A wired core memory 20 which is essentially a diode memory matrix is connected to the row, column decoder 19. The bit makeup of the data word in the memory address register 15 is decoded by the decoder 19 to select a particular row and a particular column of the wired core memory for excitation.

The cores at the storage location associated with the particular row and column excited are prewired and inductively coupled to generate signals (ONES) at a plurality of secondary windings so that the combination of high and low outputs on the secondary windings is representative of the data word input but converted to the desired code. Thus, a data word from the central processor 11 is converted to the code of the subscriber unit 12 while a data word from the subscriber unit 12 is converted to the code of the central processor 11.

Figure 5:
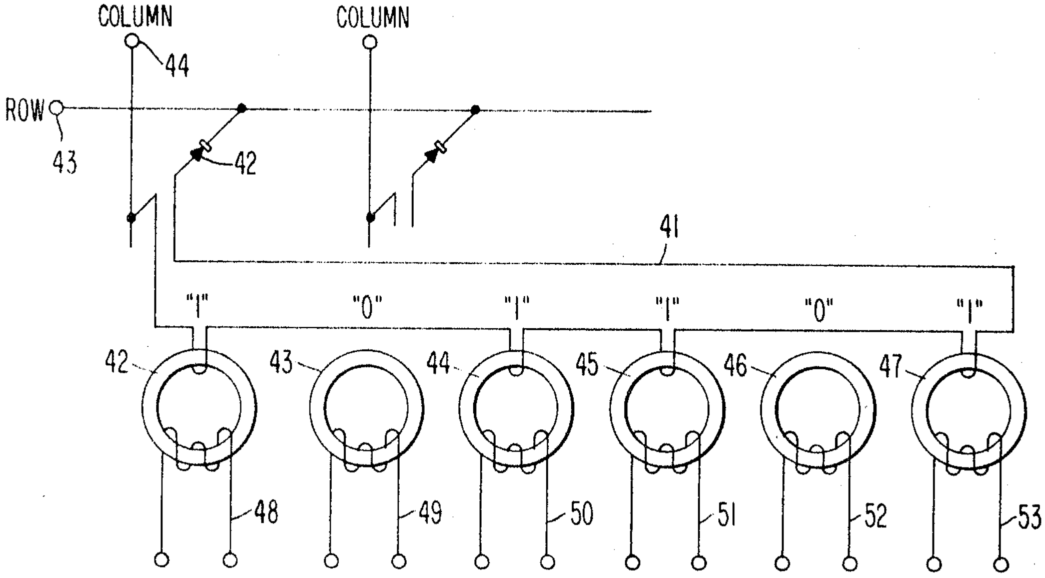
FIGURE 5 illustrates in schematic form a storage element of the wired core diode memory matrix capable of being used in the present invention.

The wired core memory 20 which is discussed in somewhat more detail in connection with FIGURE 5, is capable of being contained on a card or circuit board. Thus, the wire core memory 20 may be replaced with ones for converting any one of a variety of codes depending on the code used in the subscriber unit 12. Also, several wired core memories may be used so that the central processor 11 may be simultaneously linked with several subscriber units all operating in a different code.

An output register 21 connected to the wired core memory 20 and the subscriber unit 12 receives the output from the wired core memory 20 in parallel form and converts it to serial form for application to the subscriber unit 12. Similarly, an input buffer register 22 connected to the wired core memory 20 and the central processor 11 receives the output from the wired core memory 20 in parallel form and converts it to serial form for application to the central processor.

The output register 21 is connected to the transmit conversion control 18 which, a predetermined time after a transmit conversion cycle is initiated, provides a pulse to the output register 21 input control gating to gate the data from the wired core memory 20 into the output register 21. In like fashion, the input buffer register 22 receives a pulse from the receive conversion control 17 a predetermined time after a transmit conversion cycle is initiated to gate the data from the wired core memory 20 into the input buffer register 22. The predetermined time mentioned above is actually a clock pulse time of 333.3 nanoseconds provided by the system clock pulse source (not shown). Code conversion of each data word, whether from the central processor 11 or the subscriber unit 12 takes place in a sufficiently small amount of time (the actual conversion cycle once initiated requires 1 microsecond), so that each data word is code converted and generated at the output of the wired core memory 20 when the gating pulses to the input buffer register 22 and the output register 21 are produced by the conversion controls 17 and 18. Thus, in less than 2 microseconds (one microsecond if no priority is exercised) after a data word appears in the input register 14 or the output buffer register 16, it is inserted into the input buffer register 22 or the output register 21 in the appropriate code.

Figure 2:
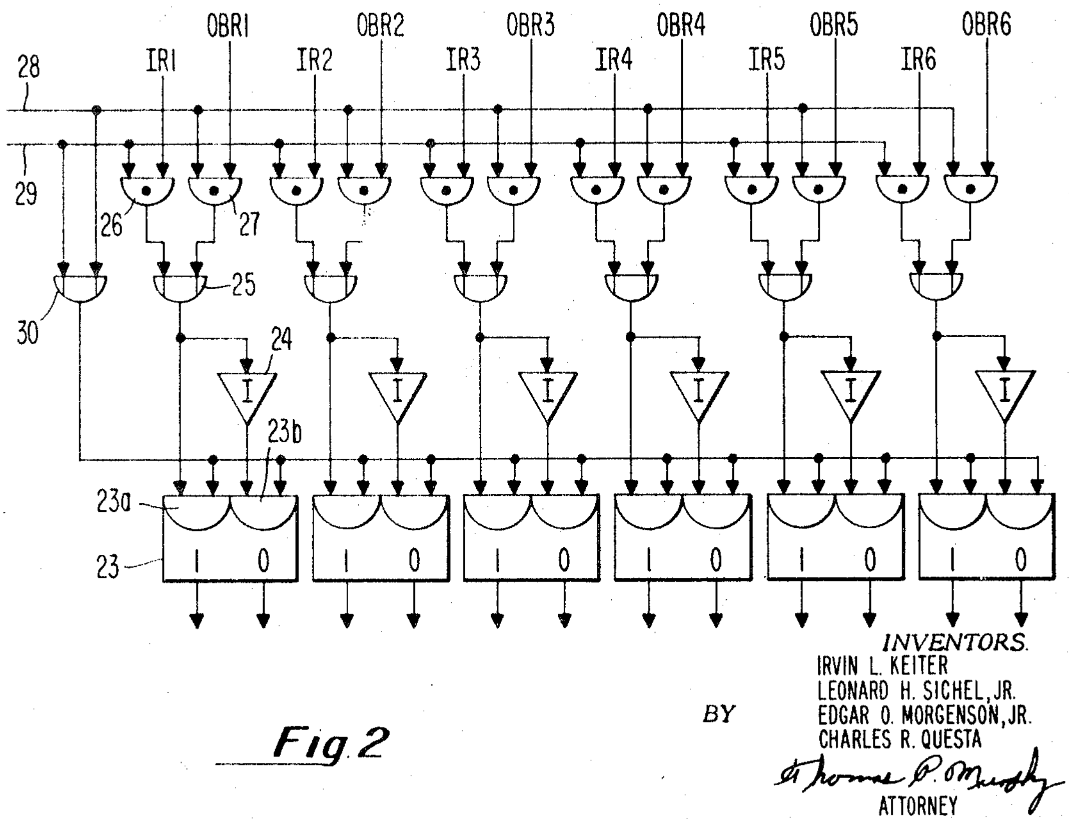
FIGURE 2 shows a block diagram for a memory address register capable of being used in the present invention.

The memory address register 15, shown in detail in FIGURE 2, comprises six storage elements, only one of which is described in detail. The other storage elements are identical, except that each receives inputs over different lines of the output terminals from the input register 14 and the output buffer register 16.

Each storage element comprises a flip-flop 23, a pair of AND gates 23*a* and 23*b*. The appropriate data word bit is gated into each memory address storage element by a control gate consisting of a pair of AND gates 26 and 27, an OR gate 25, and an inverter 24.

The control gating of the memory address register 15 has a pair of input terminals 28 and 29. The input terminal 29 is connected as one input terminal to the AND gate 26 as well as to its counterpart in each of the storage elements, as clearly seen in the drawing. The input terminal 28 is connected as an input terminal to the AND gate 27 as well as to its counterpart in each of the other storage elements.

The AND gate 26 receives its second input over the first output terminal, designated IR1, from the input register 14. The other five AND gates receive their second inputs over the second, third, fourth, fifth and sixth output terminals from the input register 14, designated in FIGURE 2 as IR2, IR3, IR4, IR5 and IR6 respectively.

The AND gate 27 receives its second input over the first output terminal, designated OBR1, from the output buffer register 16. The other five AND gates 27 receive their second inputs over the second, third, fourth, fifth and sixth output terminals from the output buffer register 16 designated in FIGURE 2 by OBR2, OBR3, OBR4, OBR5 and OBR6, respectively.

The AND gates 26 and 27 are connected to the OR gate 25 which in turn, is connected to the set side of the flip-flop 23 and to the reset side of the flip-flop 23 through the inverter 24.

The flip-flop 23 itself, as already pointed out, comprises a pair of AND gates 23*a* and 23*b*. The second input to each of the AND gates 23*a* and 23*b* as well as to their counterparts in each of the other five storage elements is provided by an OR gate 30.

The OR gate 30 has a first input terminal connected to the input terminal 29 and a second input terminal connected to the input terminal 28.

When either of the input terminals 28 or 29 has a pulse, a conversion cycle is initiated. The pulses on the input terminals 28 or 29 originate in the receive conversion control 17 or the transmit conversion control 18 in a manner to be described more fully with respect to FIGURE 3.

When the input register 14 has a word registered therein, that word appears as a particular combination of high and low signals on the output terminals IR1 through IR6. If the terminal IR1 is high and a signal then appears on the input terminal 29, the AND gate 26 provides a pulse to the AND gate 23*a* which sets the flip-flop 23 because the AND gate 23*a* also has a pulse from the OR gate 30. If, on the other hand, the input terminal IR1 is low and a signal then appears on the input terminal 29, the AND gate 26 provides no pulse. However, because of the presence of the inverter 24, the AND gate 23*b* receives an input and the flip-flop 23 provides an output pulse on its reset (ZERO) output terminal. The other storage elements function in the same manner depending on the high or low state of the terminals IR2 through IR6.

When it is the output buffer register 16 that has a data word therein and the input terminal 28 that has a pulse, the AND gate 27 provides the path through which the flip-flop 23 is set or reset.

The flip-flop 23 and each of its counterparts handle a bit of a six bit word whether that word is from the input register 14 in one code or from the output buffer register 16 in a second code. The use of the control gating elements 26, 27, 25 and 24 makes the dual use of the flip-flop 23 possible because such a flip-flop is always ready and able to attain the correct state without a previous reset.

The output terminals (12 in all) from each of the flip-flops in the memory address register 15 are connected to the row, column decoder 19. The state of the first three flip-flops determines the row selected for excitation while the state of the other three flip-flops determines the column selected for excitation.

Simple gating techniques may be employed in the decoder 19. For example, a gating arrangement may be made responsive to preselected combinations of the possible outputs from the first three flip-flops in the memory address register 15 to excite preselected rows of the wired core memory 20. Also, another gating arrangement may be made responsive to preselected combinations of the possible outputs from the second three flip-flops in the memory address register 15 to excite preselected columns of the wired core memory. Each combination of flip-flops selects a particular row or column. Such decoding is well known in the art of logical design.

Figure 3:
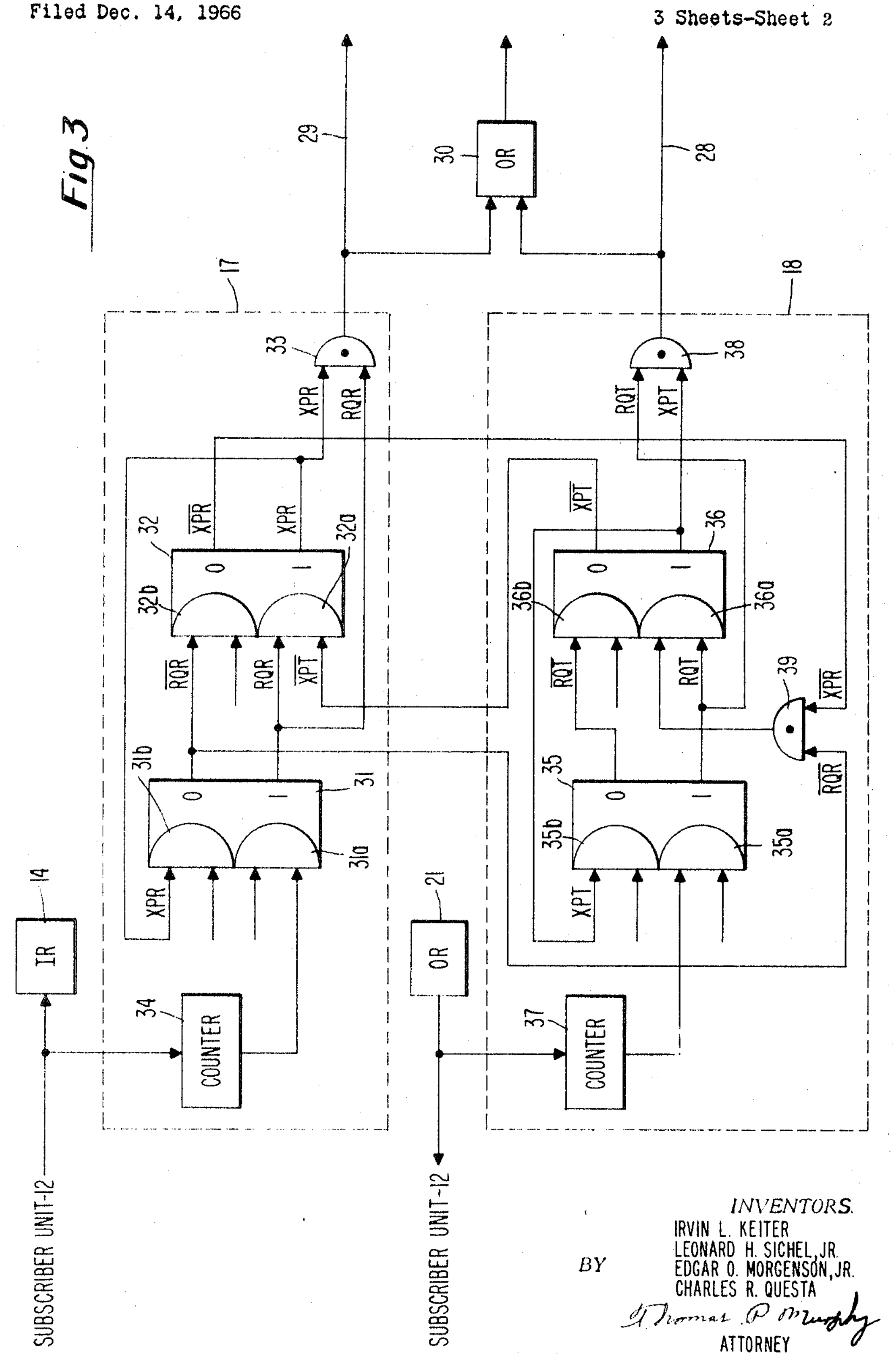
FIGURE 3 depicts in block diagram form code conversion initiation apparatus used in the present invention.

Referring to FIGURE 3, the receive conversion control 17 and the transmit conversion control 18 and their interrelationship are shown in more detail. The receive conversion control 17 which initiates code conversion of a data word received from the subscriber unit 12, comprises flip-flops 31 and 32. The flip-flops 31 and 32 are identical to the ones used in the memory address register 15. The flip-flop 31 comprises AND gate 31*a* and AND gate 31*b* while the flip-flop 32 comprises AND gate 32*a* and AND gate 32*b*.

The set output terminal of the flip-flop 31 serves as one input terminal to the AND gate 32*a* of the flip-flop 32 and as one input terminal to the AND gate 33.

The reset output terminal of the flip-flop 31 serves as one input terminal to the AND gate 32*b* of the flip-flop 32.

The set output terminal of the flip-flop 32 serves as one input terminal to the AND gate 33 and also as one input terminal to the AND gate 31*b* of the flip-flop 31. The other unused (floating) terminals to the AND gates 31*a*, 31*b* and 32*b* provide a constant high or positive potential to the AND gates 31*a*, 31*b* and 32*b*, respectively, and may be considered logically true.

Each of the flip-flops 31 and 32 are synchronously clocked in a conventional manner, i.e., each will change state only during a clock pulse provided by the system clock pulse generator (not shown).

A bit counter 34 is connected to the conductor between the subscriber unit 12 and the input register 14. The output terminal of the bit counter 34 serves as one input terminal to the AND gate 31*a* of the flip-flop 31. Each time the bit counter 34 counts six bits, indicative of a six bit data word in the input register 14, it provides a pulse to the AND gate 31*a*. The other input terminal of the AND gate 31*a* is normally high. Alternately, the other input terminal to the AND gate 31*a* may be used to prevent setting of the flip-flop 31 for a particular data word such as an octal 77 data word, i.e., one comprising all "1's" or any code which is desired to be ignored. In practice, additional means such as an AND gate may be inserted between the bit counter 34 and the flip-flop 31 to prevent setting of the flip-flop 31 if the counter output pulse is not synchronized with the end of a data word.

Figure 4:
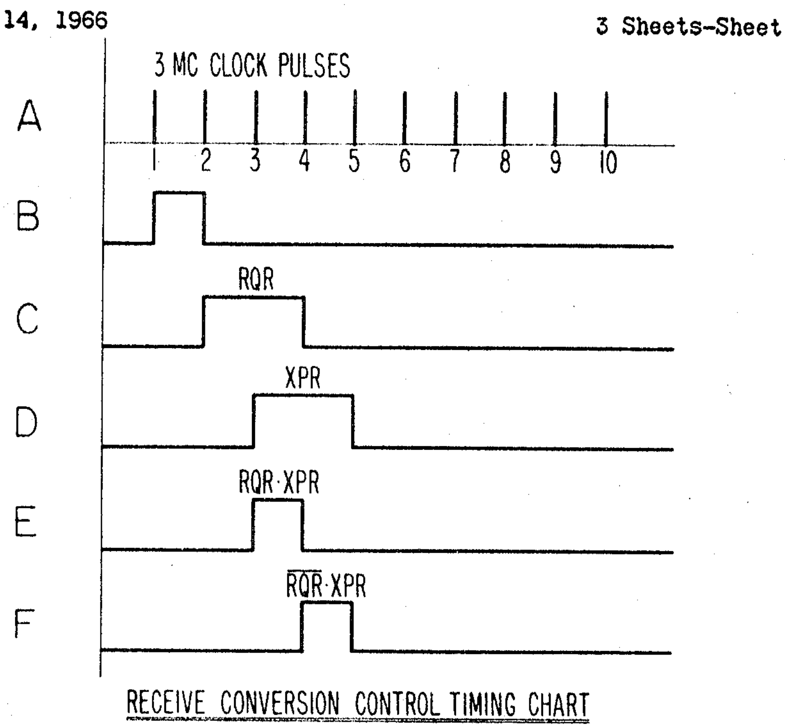
FIGURE 4 shows a code conversion cycle timing chart useful in explaining the timing relationships of the present invention.

The operation of the receive conversion control 17 is best understood by reference to the timing chart of FIGURE 4 wherein line A represents clock pulses each occurring at 333.3 nanosecond intervals. When a data word of six bits accumulates in the input register 14, the bit counter 34 which has counted the six bits provides an output pulse to the AND gate 31*a* of the flip-flop 31. This output pulse is shown in line B of the timing chart of FIGURE 4. On the next occurring clock pulse (clock pulse number 2 as labeled in the drawing) the flip-flop 31 is set and provides a request receive pulse or RQR (shown in line C of the timing chart) as one input to the AND gate 32*a*.

If the flip-flop 36 (to be discussed later) has not been set, the flip-flop 32 is set on the next clock pulse (clock pulse number 3) and provides a cross-point receive pulse XPR (shown in line D of the timing chart) as one input to the AND gate 33. Since the AND gate 33 has the request receive pulse RQR as its second input, it provides a pulse (as seen in line E) on the conductor 29, and also to the OR gate 30. As aforesaid, when the conductor 29 has a pulse a receive code conversion cycle is initiated.

As pointed out previously, the set output terminal of the flip-flop 32 is also connected as an input terminal to the AND gate **31*b* of the flip-flop 31. Therefore, on the next clock pulse (number 4 on the timing chart) the flip-flop 31 is reset. This terminates the RQR pulse as seen in FIGURE 4 at line C. On being reset the flip-flop 31 provides a pulse herein labeled $\overline{RQR}$ as an input to the AND gate 32 of the flip-flop 32. Thus, on the next clock pulse (number 5 on the timing chart) the flip-flop 32 is reset. On being reset the flip-flop 32** ceases to provide the XPR pulse and instead, provides a pulse labeled $\overline{XPR}$ on its reset output terminal.

Since the flip-flop 31 has ceased providing the RQR pulse on the third occurring clock pulse (number 4 in the timing chart), the AND gate 33 is disabled at that time, i.e., the pulse shown in line E terminates then.

It should be noted that the foregoing described cycle takes place during three clock pulse intervals, and, therefore, occupies a time interval of one microsecond. The pulse on the conductor 29 and the OR gate 30, transfers the data word in the input register 14 into the memory address register 15. The flip-flop 23 and its counterparts present the data word to the decoder 19, for immediate decoding. Once the output of the OR gate 30 goes high, the data word is decoded and will be generated at the output of the wired core memory 20 within one-third of a microsecond. This conversion cycle time is chosen to be compatible with a 3 megacycle central processor clock and is not the maximum speed capability of the conventional decoder and wired core memory in use in the present invention.

The data word is gated into the input buffer register 22 by a pulse generator by the coincidence of the $\overline{RQR}$ and XPR pulses in AND gate means (not shown) included in the receive conversion control 17. This pulse is provided on the conductor shown in FIGURE 1 as connecting the receive conversion control 17 to the input buffer register 22. This AND gate means can as easily be included in the transmit conversion control 18 instead of the receive conversion control.

FIGURE 3 also shows the transmit receive control 18 in more detail. The transmit conversion control 18 is nearly identical to the receive conversion control 17 and includes flip-flop 35 and 36, bit counter 37 and AND gate 38. In addition, it comprises AND gate 39. The reset output terminal of the flip-flop 32 provides one input terminal to the AND gate 39 while the reset output terminal of the flip-flop 31 provides the other input terminal to the AND gate 39 (priority control gating function).

The flip-flop 36 comprises AND gates **36*a* and 36*b* while the flip-flop 35 comprises AND gates 35*a* and 35*b***.

The set output terminal of the flip-flop 35 serves as one input terminal to the AND gate **36*a* as well as the AND gate 38. The output terminal of the AND gate 39 serves as the other input terminal to the AND gate 36*a***.

The reset output terminal of the flip-flop 35 serves as one input terminal to the AND gate **36*b*** whose other input terminal is always high.

The set output terminal of the flip-flop 36 serves as one of the input terminals to each of the AND gates 38 and **35*b*. The other input terminal to the AND gate 35*b*** is maintained high.

The bit counter 37 which counts the bits exiting from the output register 21 has its output terminal connected as one of the input terminals to the AND gate **35*a*. The other input terminal of the AND gate 35*a* is maintained high. In practice the output register would include a source of clock pulse having a clock pulse rate equal to the clock pulse rate at which the subscriber unit 12 operates. The clock pulse source would then strobe the output register 21 to cause the bits therein to be read out at the rate capable of being accepted by the subscriber unit 12** which may operate at a clock pulse rate many times slower than the rate at which the central processor operates.

The reset output terminal of the flip-flop 36 is as pointed out above, an input terminal to the AND gate **32*a* of the flip-flop 32**.

The transmit conversion control 18 functions in a manner similar to the receive conversion control 17. The timing chart of FIGURE 4 is useful in understanding the operation of the transmit conversion control in which case, the pulses labeled RQR and XPR become RQT and XPT, respectively.

When the bit counter 37 has counted six bits indicative of a word completing transmission from the output register 21, it produces a pulse similar to that shown in line B of the timing chart of FIGURE 4. This pulse sets the flip-flop 35 which provides an output pulse RQT to the flip-flop 36. The flip-flop 36 is then set if the pulses $\overline{RQR}$ and $\overline{XPR}$ are present as inputs to the AND gate 39. The AND gate 38 then provides an output on conductor 28 and to the OR gate 30. This initiates the transmit conversion and the data word in the output buffer register 16 is converted and transferred to the output register 21 in the same way the data word in the input register 14 was converted and transferred to the input buffer register 22. Coincidence of the signals $\overline{RQT}$ and XPT provide the pulse to the output register 21 to cause transfer of the code converted data word at the output of the wired core memory 20 into the output register 21. A simple AND gate (not shown) included in the transmit conversion control 18 provides this pulse over the conductor from the control 18 to the output register 21.

Since the flip-flop 32 cannot be set if the flip-flop 36 is not in its reset condition, i.e., providing an $\overline{XPT}$ pulse, conversion of a data word in the input register 14 will not take place while a data word from the output buffer register 16 is being converted.

Since both the flip-flops 31 and 32 must be in the reset condition before the flip-flop 36 is set, conversion of a data word in the output buffer register 16 will not take place while a data word from the input register 14 is taking place. This condition of $\overline{RQR}$ and $\overline{XPR}$ pulses necessarily being present before the flip-flop 36 can be set resolves the conflict between receive and transmit operations by giving priority to the receive operation if a data word appears simultaneously in the output register 16 and the input register 14.

FIGURE 5 illustrates a single storage location used in the wired core memory 20. The wired core memory may be a conventional 8 x 8 diode matrix wherein each core is prewired in different combinations of primary windings so that when a selected storage location is energized by exciting the particular primary windings of the core, a particular combination of secondary windings are energized to provide a particular binary output. It is easily seen that a plurality of input data words each decoded to excite a particular storage location may be converted to a different code determined by the particular combination in which windings at each storage location are energized.

Each storage location in the wired core memory 20 comprises a primary winding 41. One end of the winding 41 is connected through a diode 42 to a row input terminal 43. The other end of the winding 41 is connected to a columnn input terminal 44. Only one of the eight column inputs and only one of the eight row inputs may be enabled for any one conversion cycle. The row-column decoder 19 has sixteen output terminals, eight row and eight column outputs. A selected combination of signals from three memory address flip-flops (say the first three) causes a particular row terminal of the memory 20 to be energized. Similarly, a selected combination of signals on the last three of the memory address register terminals to the decoder 19 causes a particular column terminal of the memory to be energized. In this way a particular storage location similar to that shown in FIGURE 5 is excited.

Each storage location utilizes two sets of cores; one set is used for converting data words from the subscriber unit 12 while the other set is used for converting data words from the central processor 11.

While there are usually more, one set of cores is shown in FIGURE 5 as comprising six cores, 42, 43, 44, 45, 46 and 47; one for each bit in the data words being processed. Additional cores would be needed for words containing more bits or where a parity bit was desired.

Each core 42–47 has a secondary winding, 48, 49, 50, 51, 52 and 53. 41 is selectively prewired, one turn through the core for each desired "1" of the output code. A core is bypassed by the primary winding when a zero is desired.

As shown in FIGURE 5, the primary winding 41 passes through cores 42, 44, 45 and 47 and bypasses cores 43 and 46. Excitation of the primary winding 41 would thus energize only second windings 42, 44, 45 and 47 to provide a binary output of 10110. In an 8 x 8 diode matrix there are 63 other storage locations each of which include a primary winding. Therefore, there are 63 other possible code combinations wherein each primary winding inductively couples a particular combination of the cores.

In practice each storage location contains two sets of cores with secondary windings since bi-directional code conversion is required. In other words, each primary winding 41 has two sets of cores associated therewith with one set giving the code converted output for data words coming from the central processor 11 and the other giving the code converted output for data words coming from the subscriber unit 12. Thus, when the primary winding of a storage location is excited, a certain combination of the secondary windings on both sets of cores is energized at the same time. The combination of the secondary windings on the core set which is gated out depends on whether a receiver or a transmit operation is being performed. Obviously, the wired core memory 20 has at least 12 output terminals with six going to the output register 21 and six going to the input buffer register 22.

It should be noted that the cores in each of the storage locations function as toroidal transformers and not switching cores. Thus, considerably less excitation current and fewer circuit elements are used than required by a memory using switching cores.

The outputs from the decoder 19 are buffered by column drivers and row drivers to provide proper energization to the diode matrix input conductors. In this case a conventional row and column driver circuits properly synchronized with system timing are utilized between the decoder 19 and the wired core memory 20 to provide the excitation currents to primary winding 41.

Other modifications of the present invention are possible in the light of the above description and the illustrations of the present invention set forth should not be construed as placing limitations on the present invention other than those limitations contained in the claims which follow.

What is claimed is:

1. A bi-directional code converter comprising in combination,
- a first register for storing a first data word in a first code,
- a second register for storing a second data word in a second code,
- memory address register means connected to said first and second registers,
- first flip-flop means connected to said first register means for transforming a data word stored in said first register to the output of said memory address register means when said first flip-flop means is in its set condition,
- second flip-flop means connected to said second register for transferring a data work stored in said second register to the output of said memory address register when said second flip-flop means is in its set condition,

- first counter means connected between the input terminal of said first register and said first flip-flop means providing a pulse for setting said first flip-flop means when a data word appears in said first register,
- second counter means connected between the input terminal of said second register and said second flip-flop means providing a pulse for setting said second flip-flop means when a data word appears in said second register,
- means connected between said first and second flip-flop means inhibiting said first flip-flop means from being set when said second flip-flop means is in its set condition, and
- a core memory connected to said memory address register means responsive to being addressed by a data word in one of said first or second codes in said memory address register means to provide as an output said data word in the other of said first and second codes.

2. A code converter according to claim 1 wherein said first flip-flop means comprises,
- first and second flip-flops,
- said pulse from said first counter means setting said first flip-flop,
- first means connected between said first and second flip-flops setting said second flip-flop,
- second means connected between said second flip-flop and said second flip-flop means inhibiting the setting of said second flip-flop when said second flip-flop means is in its set condition,
- third means connected between said first and second flip-flops and said second flip-flop means permitting the setting of said second flip-flop means by a pulse from said second counter means only when said first and second flip-flops are in their set condition.

3. A code converter according to claim 1 wherein said memory address register means comprises,
- a plurality of storage elements,
- each of said storage elements simultaneously storing one of the bits from each of the data words appearing in said first and second registers,
- gate means connected to said first and second flip-flop means causing the bits from said first register which are stored in said storage elements to address said core memory when said first flip-flop means is in its set condition or the bits from said second register which are stored in said storage elements to address said core memory when said second flip-flop means is in its set condition.

4. A code converter according to claim 3 wherein said core memory comprises,
- a plurality of memory elements arranged in a matrix of rows and columns,
- a plurality of ferromagnetic cores,
- each of said memory elements comprising a primary winding inductively coupled to selected ones of said cores,
- a plurality of secondary windings equal in number to said cores, each of said secondary windings inductively coupled to one of said cores so that on electrical excitation of said primary winding, only said secondary winding inductively coupled to said selected ones of said cores provides an output.

5. A code converter according to claim 4 further including,
- decoder means disposed between said memory address register means and said core memory for exciting a selected one of the primary windings of said memory elements in response to each different data word coming from said first or second registers.

6. A code converter according to claim 1 further including, a first output register connected to said core memory for receiving the data word from said first register a predetermined time after its code conversion cycle is initiated, a second output register connected to said core memory for receiving the data word from said second register a predetermined time after its code conversion cycle is initiated, first means connected between said first flip-flop means and said first output register providing a pulse to transfer the data word from said core memory to said first output register a predetermined time after said first flip-flop means is set, second means connected between said second flip-flop means and said second output register providing a pulse to transfer the data word from said core memory to said second output register a predetermined time after said second flip-flop means is set.

References Cited

UNITED STATES PATENTS

| | | | |
|---|---|---|---|
| 2,992,421 | 7/1961 | Whitney. | |
| 3,235,664 | 2/1966 | Muroga et al. | |
| 3,241,134 | 3/1966 | Looschen. | |
| 3,268,875 | 8/1966 | Schaffer | 340—172.5 |
| 3,274,378 | 9/1966 | Crawford et al. | |
| 3,283,306 | 11/1966 | Patrusky | 340—172.5 |
| 3,293,618 | 12/1966 | Klein | 340—172.5 |
| 3,293,639 | 12/1966 | Ulrich. | |
| 3,343,140 | 9/1967 | Richmond et al. | 340—172.5 |
| 3,348,205 | 10/1967 | Lee | 340—172.5 |
| 3,354,450 | 11/1967 | Carthew et al. | 340—172.5 |

JOHN P. VANDENBURG, Primary Examiner

U.S. Cl. X.R.

340—174, 347